Patented Dec. 11, 1951

2,578,416

UNITED STATES PATENT OFFICE 2,578,416

METHODS OF MAKING NEPTUNIUM CHLORIDES

Sherman Fried, Chicago, Ill., and Norman R. Davidson, Sierra Madre, Calif., assignors to the United States of America as represented by the United States Atomic Energy Commission No Drawing. Application August 11, 1947,
Serial No. 768,058

2 Claims. (Cl. 23—14.5)

This invention relates to new compositions of matter, namely, the chlorides of trivalent and tetravalent neptunium and methods for their preparation.

An object of this invention is to provide new compounds of neptunium and in particular inorganic salts of neptunium, namely, the trichloride ($NpCl_3$), and the tetrachloride ($NpCl_4$), which salts are useful compounds in the preparation of the pure metal and higher neptunium chlorides.

A further object is to provide a method whereby these inorganic salts of neptunium can be prepared from other neptunium compounds, chiefly from the oxygen-containing compounds of neptunium.

The term "oxygen-containing compounds of neptunium" as used throughout this specification and in the appended claims is to be construed as any compound of neptunium which is readily converted to an oxide of neptunium by heating. Neptunium dioxide ($NpO_2$), neptunium oxalate ($Np(C_2O_4)_2$), neptunium carbonate ($Np(CO_3)_2$), neptunium nitrate ($Np(NO_3)_4$), and neptunyl nitrate ($NpO_2(NO_3)_2$), are representative of such compounds which can be used either alone or in combination in carrying out the process of this invention. References to neptunium and any of its compounds are meant to include all isotopes of neptunium and their compounds.

A further object of this invention is to provide a method whereby the trichloride of neptunium may be formed from another chloride, namely, neptunium tetrachloride.

Other objects will be apparent upon further examination of this specification.

In accordance with one embodiment of this invention neptunium trichloride is prepared by contacting an oxygen-containing neptunium compound with chlorine and carbon, preferably as a chlorine-containing compound of carbon, and further contacting the neptunium product thus formed with hydrogen.

A further embodiment comprises the preparation of neptunium tetrachloride by contacting an oxygen-containing neptunium compound with chloride and carbon, preferably as a chlorine-containing compound of carbon, such as carbon tetrachloride or phosgene which are suitably chlorinating agents for oxygen-containing neptunium compounds as shown by the following reaction:

$$NpO_2 + 2CCl_4 \rightarrow NpCl_4 + 2COCl_2$$

wherein phosgene is generated as a by-product and serves as a supplemental chlorinating agent for any oxide as yet unreacted according to the following reaction:

$$NpO_2 + 2COCl_2 \rightarrow NpCl_4 + 2CO_2$$

The above reactions are readily carried out at a temperature between 300 to 750° C. and preferably at a temperature between 400 to 530° C., commonly in the near vicinity of 500° C. Since the tetrachloride of neptunium formed by the process of this invention sublimes at a temperature somewhat below 536° C., it is advisable to carry out the reaction in a vessel which permits immediate sublimation of the product to a region considerably cooler than that in which the compound is formed. Removal of the product to a cooler environment by means of sublimation is advisable because neptunium tetrachloride tends to oxidize under prolonged heating within the temperature range of the reaction, especially if the chlorine supply should become depleted.

A further embodiment of this invention comprises the preparation of neptunium trichloride by contacting the chloride of tetravalent neptunium with hydrogen, preferably at a temperature between 400 and 500° C.

The preferred embodiment for the preparation of neptunium trichloride is a one-step reaction whereby the oxide is converted directly to the desired product by contacting neptunium oxide or other oxygen-containing compound of neptunium with chlorine and carbon, preferably as a chlorine-containing compound of carbon in the presence of hydrogen. Such a reaction takes place readily at a temperature somewhat lower than that usually preferred for the other embodiments of this invention. Direct preparation of the trichloride in the presence of hydrogen is suitably carried out at a temperature between 300 and 600° C. and preferably between 300 and 400° C. A low temperature reaction of this type produces a somewhat larger percentage yield of the product as compared with the yield obtained by the high temperature hydrogen reduction of the tetrachloride of neptunium since the reactant materials remain within the effective reaction zone.

In the examples set forth herein to illustrate the various embodiments of this invention, the reactions have been carried out within quartz or glass capillary reaction tubes. The capillary containing the reactant oxygen-containing compound is heated by insertion in a metal heating block suitably made of nickel and either wound with resistance wire or heated with a gas flame. The capillary is connected with a single supply line to which both a vacuum line and a supply line for the chlorine vapor or vapor of a chlorine-containing compound are joined, the respective entry of each line being controlled by stopcocks so arranged as to permit their alternate use. By appropriate manipulation of the stopcocks leading to the vacuum and admitting the chlorine vapor for contact with the neptunium compound at the bottom of the capillary, it is possible to pump out excess chlorinating agent along with any volatile reaction product such as neptunium tetrachloride or hydrogen chloride. The use of the vacuum in this apparatus serves a double purpose. During the period of evacuation of the capillary, neptunium tetrachloride can sublime to the cooler portion of the capillary beyond the heating block. Furthermore, since many anhydrous chlorides are extremely hygroscopic, the preparation of neptunium chlorides is preferably carried out in vacuo.

EXAMPLE I

Neptunium tetrachloride

Neptunium tetrachloride was formed from 20 micrograms of neptunium oxide by heating at 530° C. for one-half hour in the above-described capillary placed in the apparatus system previously outlined. During the half-hour reaction period at 530° C., carbon tetrachloride vapor was alternately admitted and pumped off at about five-minute intervals.

The neptunium tetrachloride formed by this reaction was characterized by X-ray diffraction as a tetragonal crystal with four molecules per unit cell. The lattice dimensions were as follows:

$$a_1 = 8.25 \pm .01 \text{ Å}$$
$$a_3 = 7.46 \pm .01 \text{ Å}$$

and the density calculated from these lattice dimensions is 4.92. Neptunium tetrachloride melts sharply at 538° C. and sublimes within the temperature range for its preparation.

EXAMPLE II

Neptunium trichloride

The neptunium tetrachloride formed as shown in Example I was reduced to neptunium trichloride by contact with hydrogen gas within the same capillary in which the neptunium tetrachloride had been formed. The heating block was moved to surround the upper portion of the capillary in which the neptunium tetrachloride had sublimed during its preparation. The contents of the capillary were heated to about 450° C. Hydrogen gas, purified by passage over copper and through a liquid air-cooled charcoal trap, was admitted to the system at one atmosphere pressure through the opening formerly utilized as a source of vacuum. The hydrogen was allowed to react for 10 minutes and was then pumped out to remove the hydrogen chloride formed during the reaction. Hydrogen was admitted twice more with subsequent pumping for hydrogen chloride removal. At this reaction temperature (450° C.) some of the neptunium tetrachloride had sublimed to a point beyond the effective reaction zone and so was not converted while the residual material was identified as neptunium trichloride subsequent to the reaction period.

EXAMPLE III

Neptunium trichloride

Larger yields of neptunium trichloride were obtained by direct chlorination of the oxide at 350-400° C. in the presence of hydrogen. Within this temperature range the reactant compounds remain within the effective reaction zone thus increasing the efficiency of the preparation.

Neptunium oxide, obtained by drying neptunium oxalate at 70° C., was contacted with hydrogen mixed with carbon tetrachloride vapor in an apparatus arranged identically with that previously described except that hydrogen was bubbled through liquid carbon tetrachloride and the mixture thus formed was passed to the reaction capillary. After completion of the reaction the trivalent chloride was sublimed within the quartz capillary at 750-800° C.

The trichloride of neptunium was characterized by X-ray diffraction as being hexagonal in form having 2 molecules per unit cell. The lattice dimensions were as follows:

$$a_1 = 7.405 \pm .010 \text{ Å}$$
$$a_3 = 4.273 \pm .005 \text{ Å}$$

from which the density is calculated to be 5.58. Neptunium trichloride melts over a considerable range of temperature in the neighborhood of 800° C.

The foregoing description comprises the preferred embodiments of this invention. However, many alterations and changes may be made therein without departure from the spirit and scope of this invention as set forth in this specification and in the appended claims, which are intended to cover all features of novelty disclosed herein, taken either singly or in combination.

What is claimed is:

1. The process for the preparation of neptunium trichloride comprising contacting in the presence of hydrogen neptunium dioxide with a chlorine-containing compound of carbon.

2. The process for the preparation of neptunium trichloride comprising contacting in the presence of hydrogen neptunium dioxide at a temperature between 300 and 530° C. with carbon tetrachloride.

SHERMAN FRIED.
NORMAN R. DAVIDSON.

REFERENCES CITED

The following references are of record in the file of this patent:

Friend, Textbook of Inorganic Chemistry, vol. VII, part III, pp. 293 and 294 (1926). Pub. by Charles Griffin and Co., Ltd., London. (Copy in Scientific Library.)

Seaborg, Chemical and Engineering News, vol. 23, No. 23, pp. 2190-2193 (1945). (Copy in Scientific Library.)

Brewer et al., Halides of Neptunium, MDDC-1417, Atomic Energy Commission, TID, Oak Ridge, Tenn., October 11, 1945.